United States Patent
Itoh et al.

(10) Patent No.: US 8,201,989 B2
(45) Date of Patent: Jun. 19, 2012

(54) FLUID MIXING SYSTEM AND FLUID MIXING APPARATUS

(75) Inventors: Kazutoshi Itoh, Kani (JP); Yasunori Nishimura, Kasugai (JP)

(73) Assignee: CKD Corporation, Komaki-shi (JP)

( * ) Notice: Subject to any disclaimer, the term of this patent is extended or adjusted under 35 U.S.C. 154(b) by 864 days.

(21) Appl. No.: 12/219,917

(22) Filed: Jul. 30, 2008

(65) Prior Publication Data
US 2009/0059717 A1 Mar. 5, 2009

(30) Foreign Application Priority Data
Aug. 31, 2007 (JP) ................................ 2007-226913

(51) Int. Cl.
*G05D 11/02* (2006.01)
(52) U.S. Cl. .................. 366/152.1; 137/624.2; 137/884; 366/182.4
(58) Field of Classification Search ............... 366/152.2, 366/152.1, 182.3, 182.4; 137/597, 884, 607, 137/624.2
See application file for complete search history.

(56) References Cited

U.S. PATENT DOCUMENTS

| | | | | |
|---|---|---|---|---|
| 4,392,514 A * | 7/1983 | Farley et al. | ............... | 137/624.2 |
| 4,721,458 A * | 1/1988 | Conrad | ............... | 432/205 |
| 4,938,256 A * | 7/1990 | Wiegleb et al. | ............... | 137/607 |
| 5,662,143 A * | 9/1997 | Caughran | ............... | 137/884 |
| 6,047,719 A * | 4/2000 | Ruther et al. | ............... | 137/624.2 |
| 6,210,482 B1 * | 4/2001 | Kitayama et al. | ............... | 118/715 |
| 6,382,238 B2 * | 5/2002 | Ishii et al. | ............... | 137/271 |
| 6,631,334 B2 * | 10/2003 | Grosshart | ............... | 702/50 |
| 6,752,166 B2 * | 6/2004 | Lull et al. | ............... | 137/9 |
| 6,886,599 B2 * | 5/2005 | Ichikawa et al. | ............... | 137/884 |
| 7,216,019 B2 * | 5/2007 | Tinsley et al. | ............... | 700/282 |
| 2006/0166546 A1 * | 7/2006 | Ashizawa et al. | ............... | 439/373 |
| 2009/0095364 A1 * | 4/2009 | Itoh et al. | ............... | 137/861 |

FOREIGN PATENT DOCUMENTS

| | | |
|---|---|---|
| JP | 52-133294 | 11/1977 |
| JP | A-6-222049 | 8/1994 |
| JP | A-2006-272323 | 10/2006 |
| JP | A 2007-175690 | 7/2007 |
| JP | A 2007-175691 | 7/2007 |

OTHER PUBLICATIONS

Office Action issued in CN 200810211190.6, issued Mar. 18, 2011. (with English-language translation).
Korean Office Action issued in Korean Patent Application No. 10-2008-0084568 dated Aug. 6, 2010 (with translation).
Japanese Office Action issued Feb. 28, 2012 in Japanese Patent Application No. 2007-226913 (with translation).
Chinese Office Action dated Feb. 29, 2012 in Japanese Patent Application No. 200810211190.6 (with translation).

* cited by examiner

*Primary Examiner* — Robert B Davis
(74) *Attorney, Agent, or Firm* — Oliff & Berridge, PLC

(57) ABSTRACT

A fluid mixing system capable of quickly stabilizing flow rates of a plurality of fluids to be mixed is arranged to mix the fluids and deliver a mixture thereof to a container. The system includes a plurality of on-off valves for the respective fluids and delivering the fluids to the container. The on-off valves are caused to open and close in order according to respective duty ratios each indicating an opening/closing ratio in a cycle.

7 Claims, 14 Drawing Sheets

FLUID MIXING SYSTEM AND FLUID MIXING APPARATUS

BACKGROUND OF THE INVENTION

1. Field of the Invention

The present invention relates to a fluid mixing system and a fluid mixing apparatus for mixing and delivering a plurality of fluids at a predetermined mixture ratio.

2. Description of Related Art

In a semiconductor manufacturing process and the like, after an insulating film or metal film is deposited on a wafer (a film formation step), a photoresist pattern is formed on the wafer (a photolithographic step), then the film is processed using the photoresist pattern (an etching step), then a conductive layer is formed on the silicon wafer (an impurity doping step) and the uneven film surface is smoothed by polishing (a CMP step). Meanwhile, in the semiconductor manufacturing process, dirt or dust is removed from the wafer (a cleaning step), the used photoresist is removed (a resist peeling step) and the wafer is heated (an annealing step).

As above, in a semiconductor manufacturing process, different kinds of steps are combined and carried out repeatedly in order to make devices such as transistors and wiring in a wafer. In the process, at steps such as thin film formation, annealing and etching steps, a plurality of gases are mixed and supplied to the wafer. At the photolithographic step or the like, a plurality of chemical liquids are mixed and supplied to the wafer. Since the mixture ratio of gases or the mixture ratio of chemical liquids influences the film thickness or the like, it must be strictly controlled. For controlling such mixture ratios, a semiconductor manufacturing system conventionally uses a fluid mixing system which mixes and delivers a plurality of fluids (gases, chemical liquids, etc).

FIG. 14 is a block diagram showing an example of a conventional fluid mixing system 100.

The fluid mixing system 100 is arranged to mix two kinds of gasses X and Y supplied from gas sources 103A and 103B respectively at a specified mixture ratio and deliver the mixed gas to a process chamber 111 which is depressurized by a vacuum pump 112.

In the fluid mixing system 100, when a first valve 102A and a second valve 102B are opened to allow the gasses X and Y to flow into the process chamber 111, a first mass flow controller 101A and a second mass flow controller 101B adjust the gasses X and Y to preset flow rates depending on the mixture ratio. The gasses X and Y delivered from the first and second valves 102A and 102B converge and mix before flowing into the process chamber 111.

As the two kinds of gasses X and Y mixed at a predetermined ratio are supplied, processing such as film formation (deposition) is started in the process chamber 111 (for example, see JP2007-175691A).

However, in the conventional fluid mixing system 100, it takes time from when the first and second mass flow controllers 101A and 101B start flow control until the gases X and Y are adjusted to the preset flow rates and are stably supplied to the process chamber 111.

Concretely, the inventors conducted an experiment where they specified 6 sccm as the flow rate for the gas X with a larger specific gravity (for example, $SF_6$) and 200 sccm as the flow rate for the gas Y with a smaller specific gravity (for example, nitrogen) to obtain a mixture ratio of 3:100 and measured the output flow rates from the first and second mass flow controllers 101A and 101B and the flow rate at an outlet of the fluid mixing system 100 delivering the mixed gas to the process chamber 110. The flow velocity depends on a pipe diameter. In this experiment, the above gasses X and Y are identical in terms of flow velocity conditions which are associated with pipe diameters. The result of the experiment is shown in FIG. 15.

As indicated by a first MFC command signal and a second MFC command signal in FIG. 15, in the fluid mixing system 100, as the first and second mass flow controllers 101A and 101B are turned ON to start controlling the above gasses X and Y simultaneously, the output flow rates from the first and second mass flow controllers 101A and 101B reach the respective preset flow rates about one second after the start of flow control, as indicated by a solid line and a dotted line in FIG. 15.

On the other hand, as indicated by a bold line in FIG. 15, the outlet flow rate of the fluid mixing system 100 becomes stable at 200 sccm about five seconds after the start of flow control and then about 15 seconds after the start of flow control, it begins to increase gradually and about 40 seconds after the start of flow control, reaches 206 sccm, a total flow rate of the above gases X and Y, and stabilizes thereat.

As described above, in the fluid mixing system 100, even after the first and second mass flow controllers 101A and 101B turn ON simultaneously and start controlling the gases X and Y to the preset flow rates, the gas X having a larger specific gravity (heavier gas) reaches the process chamber 111 later than the second gas Y having a smaller specific gravity (lighter gas). It takes as much as about 40 seconds until the gases X and Y reach the process chamber 111 stably at the respective preset flow rates.

The inventors studied the above reason and reached the following conclusion.

The gas Y, smaller in specific gravity than the gas X, is easier to flow than the gas X. Besides, the flow rate of the gas Y is higher than that of the gas X. Therefore, the gas Y generates a larger differential pressure between the second mass flow controller 101B and the process chamber 111 and thus the gas Y is likely to be supplied to the process chamber 111 at the preset flow rate earlier than the gas X.

On the other hand, the specific gravity of the gas X is larger than that of the gas Y and the gas X is less easy to flow than the gas Y. When the gas X is going to join the gas Y, the pressure in the process chamber 111 has already risen due to the gas Y, which is a more difficult condition for the gas X to flow than for the gas Y. In short, it is not easy for the gas X to join the gas Y. It is not until the pressure of the gas X delivered from the first mass flow controller 101A becomes higher than the pressure in the process chamber 111 that the gas X starts to join the gas Y. Then, the gas X is gradually increased in flow rate and allowed to be supplied to the process chamber 111 at the preset flow rate.

It can be thought as above that the lighter gas Y retards flow of the heavier gas X and the gas X reaches the process chamber 111 later than the gas Y.

At steps in the semiconductor manufacturing process in which a mixed gas is used, processing is started after the mixture ratio of the mixed gas is stabilized, that is, after the flow rates of plural gases to be mixed become stable at their respective preset flow rates. This waiting period is considered waste of time because no processing is done on the wafer during that period, which leads to a decline in the productivity in the manufacture of semiconductors. With this background, in the semiconductor manufacturing industry and others, there has been a strong demand for a system in which the flow rates of fluids to be mixed are stabilized quickly.

BRIEF SUMMARY OF THE INVENTION

The present invention has been made in view of the above circumstances and has an object to provide a fluid mixing system and a fluid mixing apparatus capable of quickly stabilizing flow rates of a plurality of fluids to be mixed.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a fluid mixing system connectable to a plurality of fluid sources for individually supplying fluids and a container and arranged to mix the fluids and deliver the mixed fluid to the container, the system comprising: a plurality of on-off valves to be provided between the fluid sources and the container to deliver the mixed fluid to the container; and a control part for controlling the on-off valves to open and close in order at a duty ratio indicating an opening/closing ratio in a cycle.

According to another aspect, the present invention provides a fluid mixing apparatus which will be used for the above fluid mixing system, the apparatus comprising: the plurality of on-off valves; and an output pipe for coupling the on-off valves arranged in parallel to each other.

According to another aspect, the present invention provides a fluid mixing apparatus for mixing and delivering fluids, comprising: a plurality of fluid supply units, each including a pressure regulating device and an on-off valve integrally coupled in series; an output pipe coupled with the fluid supply units arranged in parallel; and a control device which opens and closes the on-off valves of the fluid supply units respectively in order according to respective duty ratios each indicating an opening/closing ratio in a cycle.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a fluid mixing system and a fluid mixing apparatus embodying the present invention will now be given referring to the accompanying drawings.

(First Embodiment)
<General Configuration of Semiconductor Manufacturing System>

Figure 1:
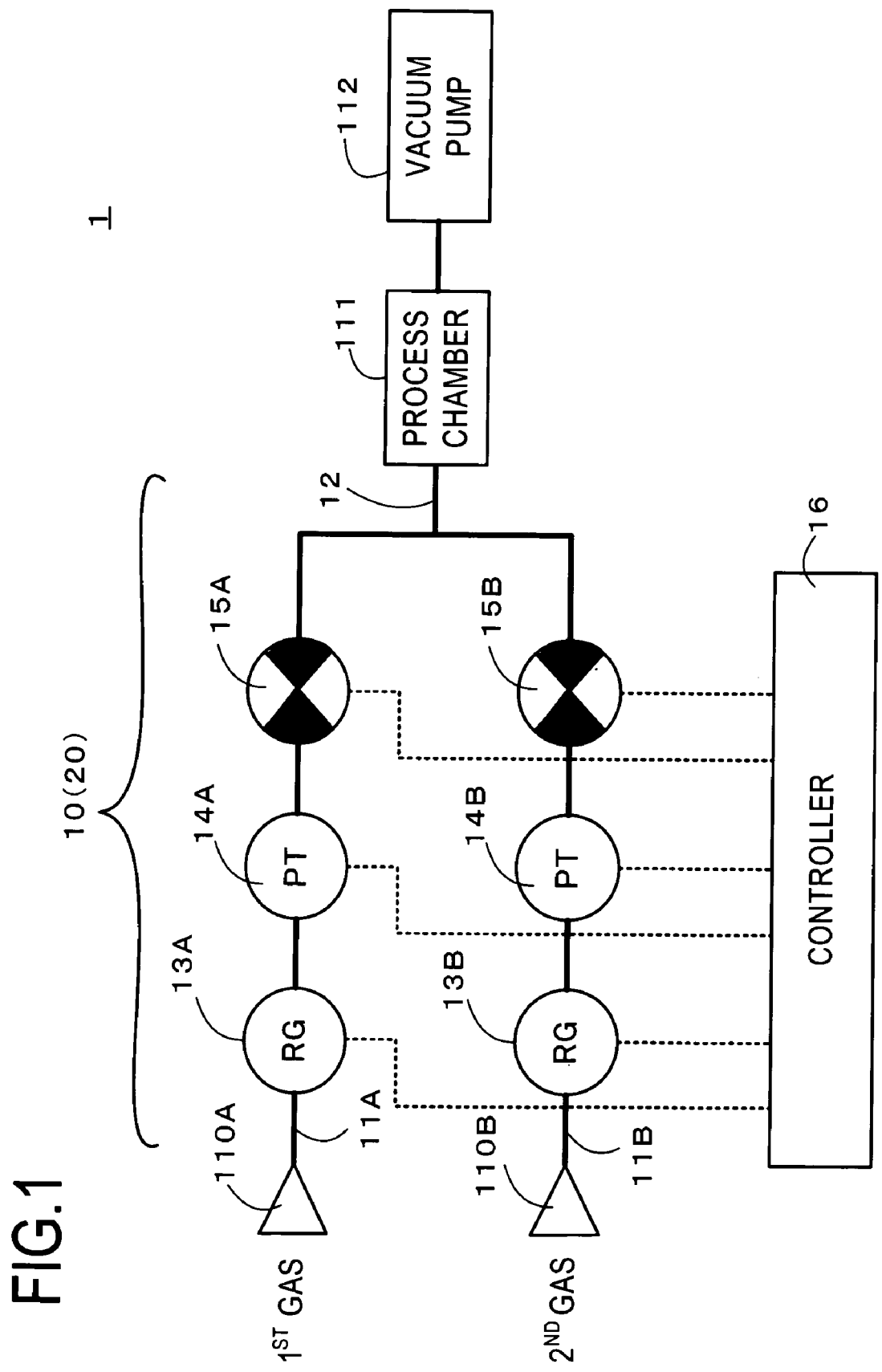
FIG. 1 is a block diagram of a semiconductor manufacturing system incorporating a fluid mixing system of a first embodiment.

FIG. 1 is a block diagram of a semiconductor manufacturing system 1 which adopts a fluid mixing system 10 according to a first embodiment of the present invention.

As in the related art, the fluid mixing system 10 in the first embodiment is used in a semiconductor manufacturing process to mix a first gas A and a second gas B and deliver the mixed gas to a process chamber 111. The fluid mixing system 10 and a fluid mixing apparatus 20 in the first embodiment are arranged to open or close a first and a second valve 15A and 15B in turn to deliver the first and second gases A and B as an example of fluids to be mixed so that those gases A and B are mixed.

In the semiconductor manufacturing system 1, after the process chamber 111 is depressurized to a predetermined pressure level, for example, by a vacuum pump 112, a mixture of the first and second gases A and B is introduced from the fluid mixing system 10 into the process chamber 111 to form a thin film on a wafer placed in the chamber 111. In the first embodiment, for example, the first gas A is a gas with a small specific gravity (light gas) such as nitrogen gas, and the second gas B is a gas with a large specific gravity (heavy gas) such as $SF_6$.

<General Configuration of the Fluid Mixing System>

In the fluid mixing system 10, a first supply line 11A connected with a gas source 110A of the first gas A and a second supply line 11B connected with a gas source 110B of the second gas B are connected with a common line 12. In the first and second supply lines 11A and 11B, a first and second regulators (an example of a pressure regulating device) 13A and 13B, a first and second pressure sensors 14A and 14B, and a first and second valves 15A and 15B are disposed from upstream respectively. The first and second regulators 13A and 13B, the first and second pressure sensors 14A and 14B, and the first and second valves 15A and 15B are connected with a controller (an example of a control unit) 16 for controlling operations thereof.

<General Configuration of the Fluid Mixing Apparatus>

Figure 2:
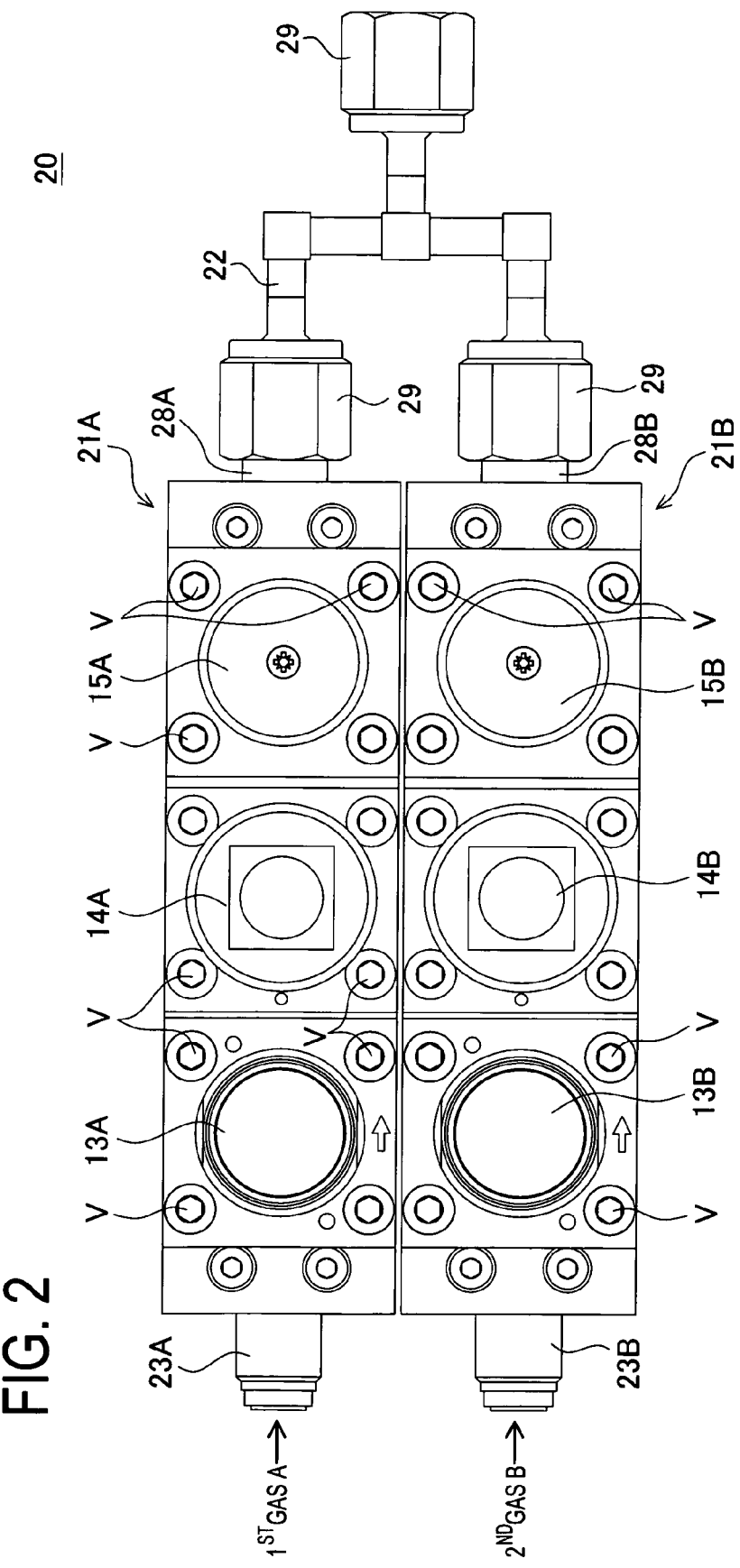
FIG. 2 is plan view of a fluid mixing apparatus of the fluid mixing system.
Figure 3:
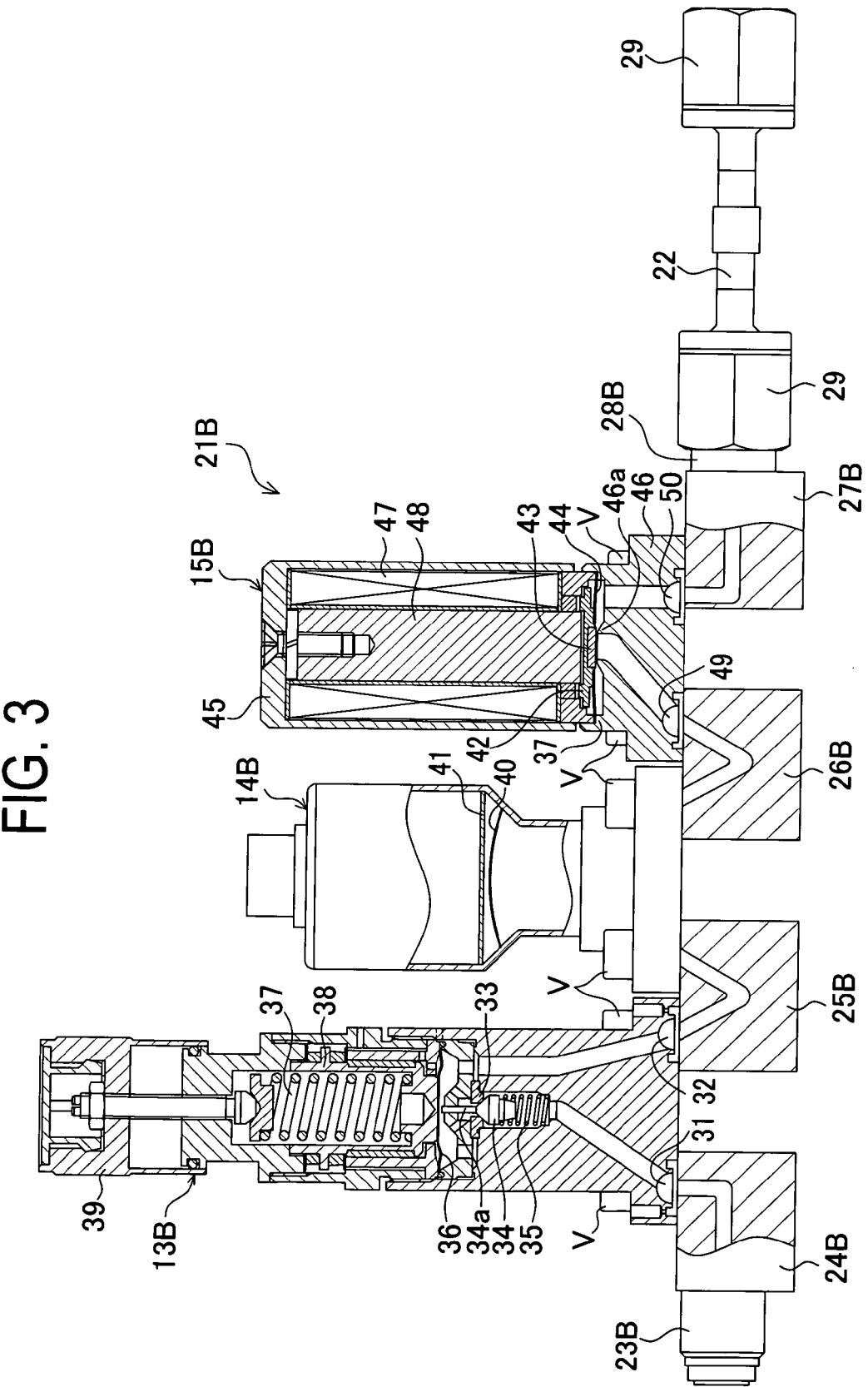
FIG. 3 is a fragmentary sectional side view of the fluid mixing apparatus shown in FIG. 2.

FIG. 2 is a plan view of the fluid mixing apparatus 20 shown in FIG. 1. FIG. 3 is a fragmentary sectional side view of the fluid mixing apparatus 20 shown in FIG. 2.

In the fluid mixing apparatus 20, a first gas supply unit (an example of a fluid supply unit) 21A which constitutes the first supply line 11A and a second gas supply unit (an example of a fluid supply unit) 21B which constitutes the second supply line 11B are arranged in parallel and connected with an output pipe 22. The first and second gas supply units 21A and 21B are identical in structure and therefore the following explanation is made on the second gas supply unit 21B.

In the gas supply unit 21B, a regulator 13B, a pressure sensor 14B, and an on-off valve 15B are placed on an input block 24B, flow path blocks 25B and 26B, and an output block 27B, and fastened to the blocks with bolts V from above, so that they are integrally coupled in series. A connection port 28B on the output block 27B is connected with the output pipe 22 through a joint 29.

The output pipe 22 has a U-shaped converging pipe whose ends are connected with the first and second gas supply units 21A and 21B respectively and an output pipe joined to the converging pipe and attached with the joint 29 at an end thereof.

The fluid mixing apparatus 20 is built in the semiconductor manufacturing system 1 by connecting a connection port 23B of the input block 24B to gas supply piping and connecting the output pipe 22 to the process chamber 111 through the joint 29.

As shown in FIG. 3, the regulator 13B has a first port 31 and a second port 32 communicated with each other through a valve seat 33. A valve element 34 is constantly urged upward in the figure by a first spring 35. The valve element 34 has a pin 34a extending through the valve seat 33. A diaphragm 36 is located above the pin 34a. A movable shaft 38 is in contact with a back pressure surface of the diaphragm 36 on which the elastic force of a second spring 37 as adjusted by a pressure regulating mechanism 39 is exerted.

In this regulator 13B, in order to regulate the gas pressure, the diaphragm 36 shifts according to the balance between the resultant of the elastic force of the first spring 35 acting on a pressure-receiving surface of the diaphragm 36 upward in the figure and the gas pressure, and the elastic force of the second spring 37 acting on the back pressure surface of the diaphragm 36 downward in the figure. When the gas pressure is higher than a preset level, the diaphragm 36 shifts upward to decrease the distance between the valve element 34 and the valve seat 33, thereby decreasing the flow rate of gas flowing out of the regulator 13B through the second port 32 to decrease the gas pressure. Conversely, when the gas pressure is lower than the preset level, the diaphragm 36 shifts downward to increase the distance between the valve element 34 and the valve seat 33, thereby increasing the flow rate of gas flowing out of the regulator 13B through the second port 32 to increase the gas pressure.

The regulator 13B is manually adjusted to set a desired pressure value. Specifically, the pressure setting is increased by turning the pressure regulating mechanism 39 of the regulator 13B in a normal direction to increase the elastic force of the second spring 37 and it is decreased by turning the pressure regulating mechanism 39 in a reverse direction to decrease the elastic force of the second spring 37.

The pressure sensor 14B is used to measure the pressure upstream of the on-off valve 15B. In this embodiment, the pressure sensor 14B is a capacitance manometer. The pressure sensor 14B has a thin metal diaphragm 40 with a thickness of about 0.1 mm which is so held as to shift depending on the gas pressure, with a metal base plate 41 fixed on a back pressure surface of the diaphragm 40. A conductive electrode is wired on the metal base plate 41. In this pressure sensor 14B, as the diaphragm 40 shifts as its pressure-receiving surface receives a gas pressure, the distance between the metal base plate 41 and the diaphragm 40 changes, thus causing capacitance changes. Therefore, change in gas pressure is detected by correlation with the change in capacitance.

The on-off valve 15B may be an electromagnetic valve or air-operated valve or any other type of valve as far as it has a Cv value that can meet a specified flow rate. In order to obtain flow characteristics as described later in a wide range, it is desirable that the first and second valves 15A and 15B less oscillate in opening or closing and have an operation cycle with a sufficient responsiveness to duty control. This operation cycle is one cycle (100%) which is used as a standard for the duty control of the first and second valves 15A and 15B. In this embodiment, for example, the on-off valve 15B has an operation cycle of 5 ms to 500 ms and it is desirable to use this operation cycle as one cycle.

The first embodiment uses an electromagnetic valve for the on-off valve 15B. This valve 15B has a plate-like movable core 42 and a valve sheet 43 which are both fixed on a leaf spring 44. A periphery edge of the leaf spring 44 is held between a bonnet 45 and a valve body 46. The on-off valve 15B also has a solenoid 47 placed inside the bonnet 45. A fixed core 48 is fixed in the solenoid 47.

In the thus constructed on-off valve 15B, the valve sheet 43 is held in contact with the valve seat 46a by the spring force of the leaf spring 44 to produce a valve sealing force. As an electric current is supplied to the solenoid 47 to excite the fixed core 48, the fixed core 48 attracts the movable core 42 against the spring force of the leaf spring 44, thereby separating the valve sheet 43 from the valve seat 46a. Consequently, the gas supplied to an input port 49 is allowed to flow through the valve seat 46a to an output port 50 and exits the on-off valve 15B. At this time, the gas flow rate depends on the valve opening degree. In other words, the gas flow rate depends on the current supplied to the solenoid 47.

<Electrical Configuration of the Controller>

Figure 4:
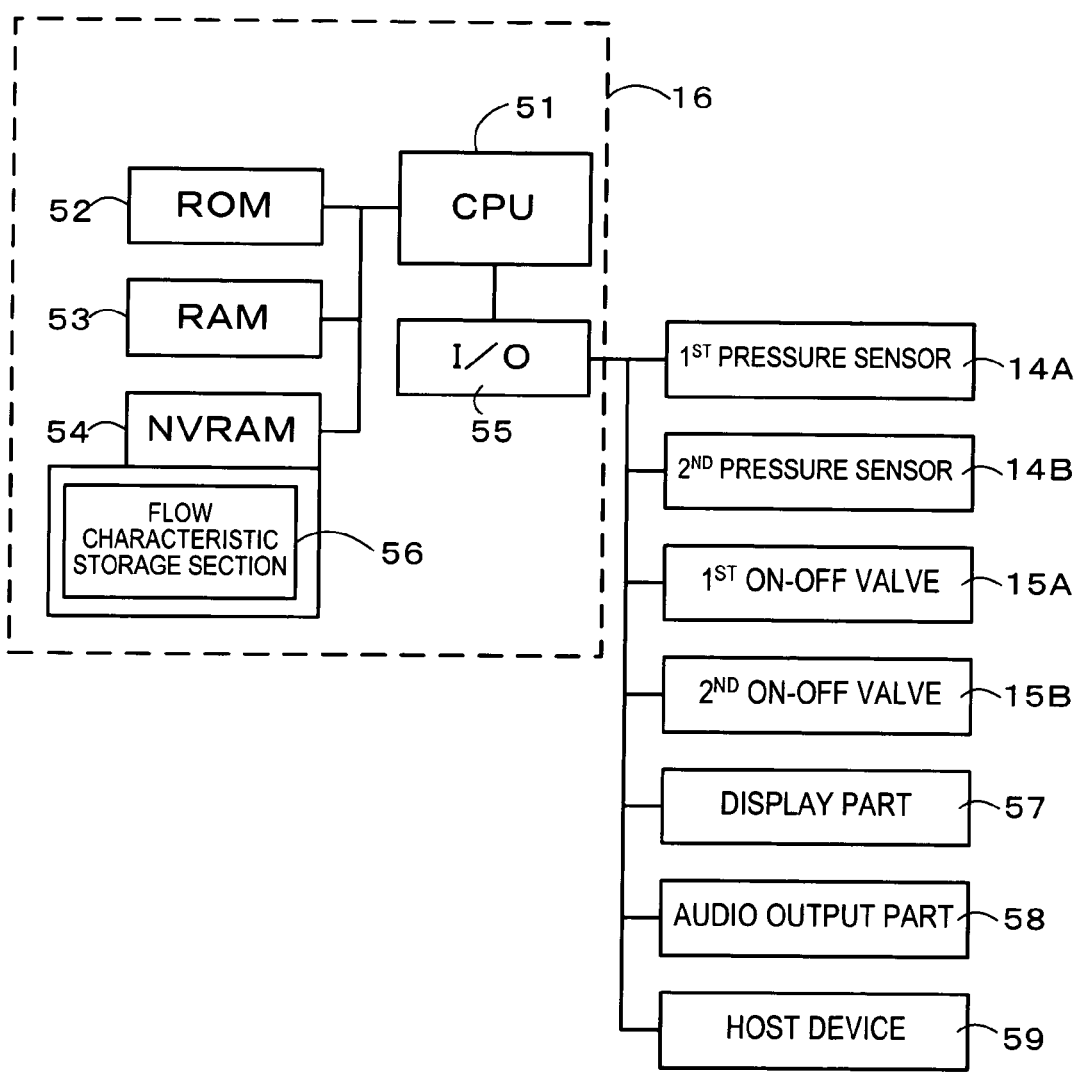
FIG. 4 is an electrical block diagram of a controller.

FIG. 4 is an electrical block diagram of the controller 16 shown in FIG. 1.

The controller 16 is a known microcomputer in which a CPU 51 is connected with a ROM 52, a RAM 53, an NVRAM 54, and an I/O interface 55. The controller 16 may be built in the fluid mixing apparatus 20 or built in a host device 59 attached to the fluid mixing apparatus 20. In the first embodiment, it is built in the fluid mixing apparatus 20.

The ROM 52 is a nonvolatile read-only memory which stores various data and programs. The RAM 53 is a volatile readable and writable memory which functions as a working memory.

The I/O interface 55 controls input and output of signals. The I/O interface 55 is connected with the first and second pressure sensors 14A and 14B, the first and second valves 15A and 15B, a display part 57, an audio output part 58, the host device 59, and so on. The controller 16 monitors the primary pressures of the first and second valves 15A and 15B through the first and second pressure sensors 14A and 14B. If abnormality is found, the controller 16 gives a warning through the display part 57 and the audio output part 58 to notify users thereof and/or sends an abnormality detection signal to the host device 59 which controls the whole semiconductor manufacturing system 1.

The NVRAM 54 is a nonvolatile readable and writable memory. The NVRAM 54 includes a flow characteristic storage section 56 which stores flow characteristics by gas type where the flow characteristics represent a linear relation between a duty ratio as an opening/closing ratio of the on-off valve 15B (15A) in a given cycle and an output flow rate from the on-off valve 15B (15A) provided when the valve 15B (15A) opens and closes according to the duty ratio. The flow characteristics may be theoretical values calculated from gas characteristics or design values of the fluid mixing apparatus 20 or actual measured values obtained by introducing gases into the fluid mixing apparatus 20. The flow characteristics may be stored as tabular data or mapped data.

Figure 5:
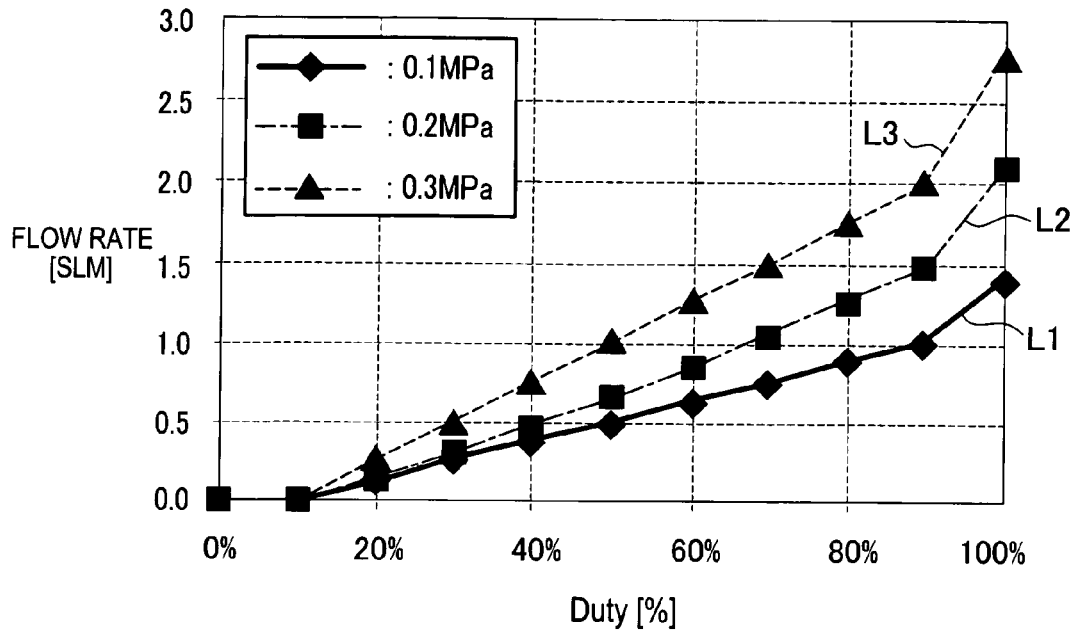
FIG. 5 is a graph showing an example of fluid characteristics of a first gas stored in a fluid characteristic storage section in the controller.
Figure 6:
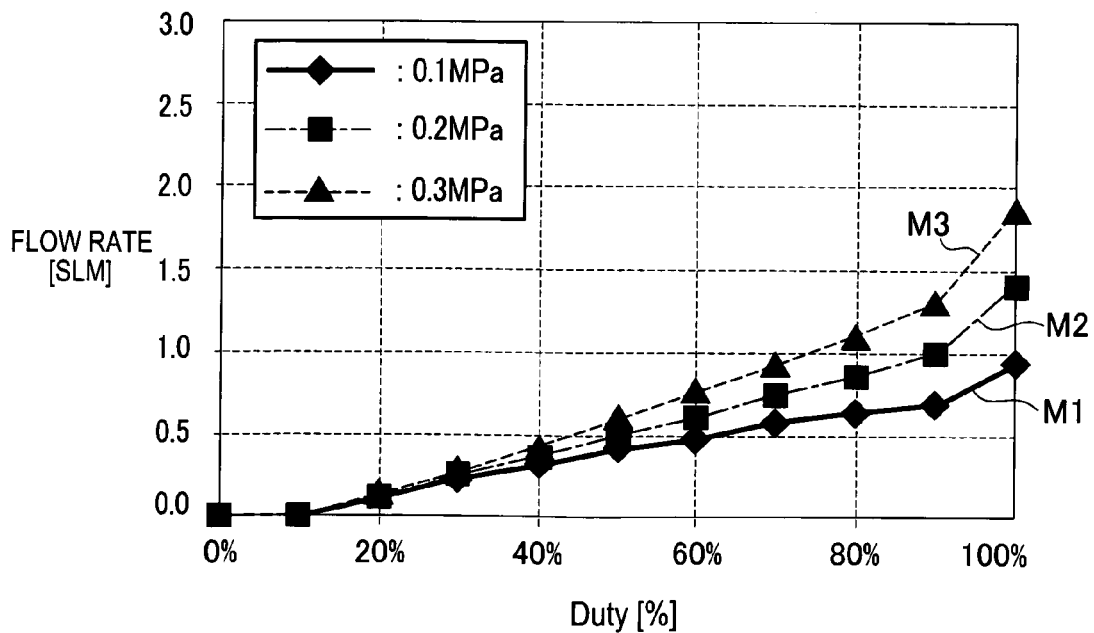
FIG. 6 is a graph showing an example of fluid characteristics of a second gas stored in a fluid characteristic storage section in the controller.

FIGS. 5 and 6 show an example of flow characteristics stored in the flow characteristic storage section 56.

In the first embodiment, as shown in FIGS. 5 and 6, the flow characteristics of the first gas A and second gas B, which represent the relations between gas flow rate and duty ratio, are stored in the flow characteristic storage section 56 in advance as mapped data for each pressure value. The flow characteristics are defined in a range in which a linear relation is established between duty ratio and flow rate.

In the first embodiment, in the duty ratio range of less than 10%, the on-off valve 15 starts to open and the flow characteristics are unstable. On the other hand, in the duty ratio range of more than 90%, the on-off valve 15B (15A) fully opens and the flow characteristics are unstable. When the duty ratio is 10% or more and 90% or less, the valve sheet 43 of the on-off valve 15B (15A) moves at almost a constant acceleration and the gas flow rate stably changes in response to the valve opening degree. Therefore, in the first embodiment, the relations between duty ratio and flow rate in the duty ratio range of 10% or more and 90% or less are stored as flow characteristics in the flow characteristic storage section 56.

As shown in FIGS. 5 and 6, for the first and second gases A and B, the gradient of the flow characteristics is larger at a larger pressure. In other words, for the first and second gases A and B, at a larger gas pressure, the flow rate at each duty ratio is higher.

In comparison in flow characteristics between the first gas A with a smaller specific gravity (lighter gas) (FIG. 5) and the second gas B with a larger specific gravity (heavier gas) (FIG. 6), the gradient of the flow characteristics of the first gas A is larger than that of the second gas B. This is because the specific gravity of the first gas A is smaller than that of the second gas B and thus the first gas A is easier to flow than the second gas B and its flow rate is higher at the same duty ratio.

<Operation>

For instance, it is assumed that in the fluid mixing system 10, the controller 16 receives, from the host device 59, a command that the first gas A and the second gas B should be supplied to the process chamber 111 at 0.75 slm and 0.25 slm respectively.

The controller 16 reads the flow characteristics corresponding to the first and second gases A and B to be mixed, from the flow characteristic storage section 56 of the NVRAM 54 and copies them into the RAM 53. At this time, the fluid mixing system 10 selectively reads, from the flow characteristic storage section 56, flow characteristics L1 and M2 from among the flow characteristics L1 to L3 (FIG. 5) of the first gas A and flow characteristics M1 to M3 (FIG. 6) of the second gas B because the flow rate at a duty ratio of 90% in L1 and M2 is equal to the total flow rate (1.0 slm) as the sum of the flow rates of the first and second gases A and B (0.75 slm and 0.25 slm).

In the fluid mixing system 10, the first and second on-off valves 15A and 15B are opened and closed alternately to deliver the first gas A and second gas B to the process chamber 111 according to the duty ratio. To this end, the controller 16 inverts the duty ratio for the flow characteristics M2 of the second gas B stored in the RAM 53. This is graphically expressed by M2' in FIG. 7 in combination with the flow characteristics L1 of the first gas A.

Figure 7:
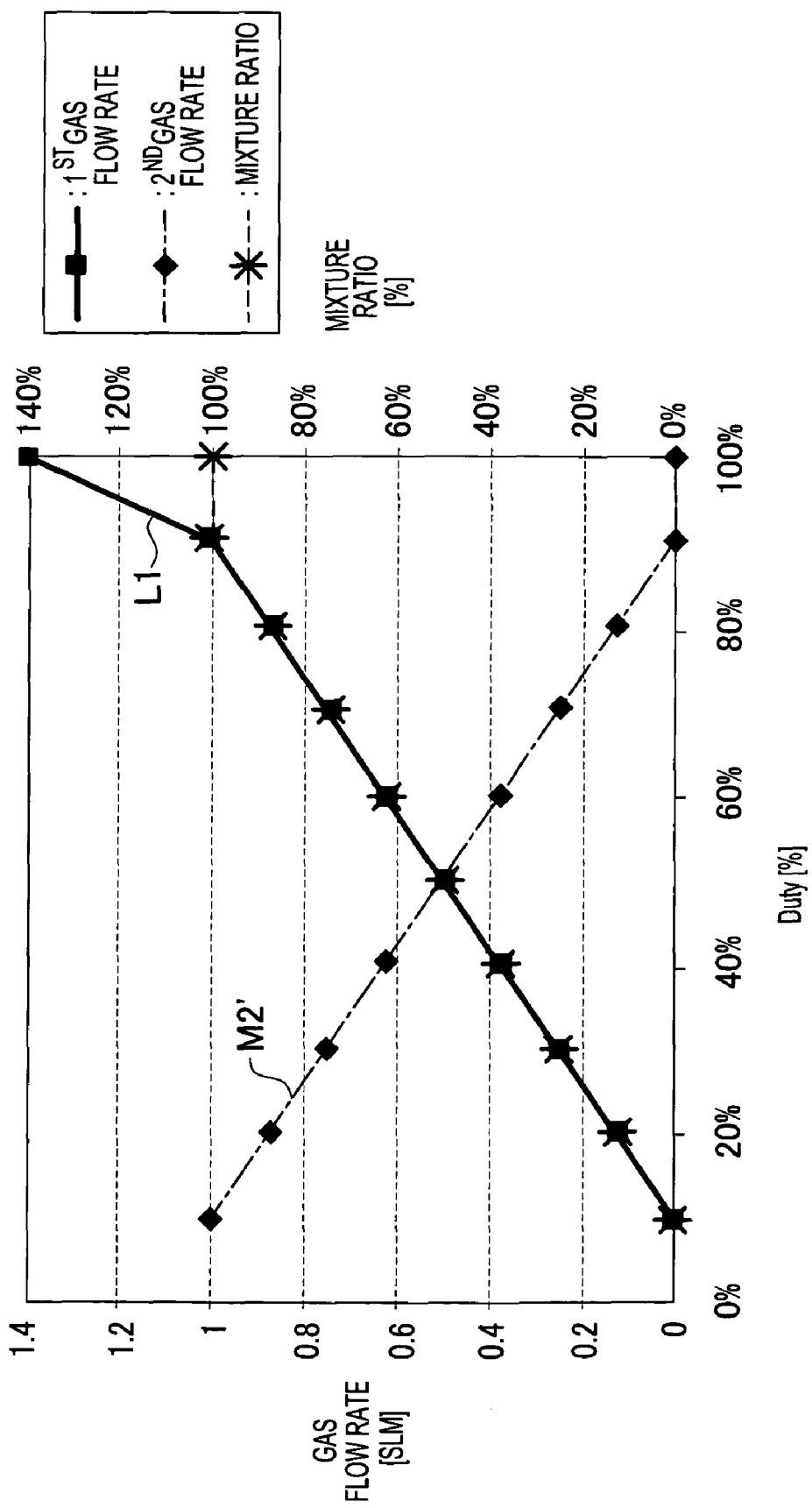
FIG. 7 is a graph showing an example of a relationship among a duty ratio for controlling a first and second on-off valves in operating the fluid mixing system, a flow rate corresponding to the duty ration, and a mixture ratio of the first gas and the second gas.

FIG. 7 shows an example of the relation among a duty ratio for controlling the first and second valves 15A and 15B in operation of the fluid mixing system 10 shown in FIG. 1, the flow rate corresponding to the duty ratio, and the mixture ratio of the first gas A and second gas B. A horizontal axis represents duty ratio (%), a left vertical axis represents flow rate (slm), and a right vertical axis represents the mixture ratio (%) of the first gas A to the second gas B.

As indicated in FIG. 7, the mixture ratio linearly changes according to the relation between the duty ratio and flow rate of the first gas A. Therefore, the fluid mixing system 10 can obtain a desired mixture ratio of the first and second gases A and B by controlling the duty ratio.

The controller 16 checks the flow characteristics L1 stored in the RAM 53 to find the duty ratio of the first gas A that corresponds to the specified flow rate (0.75 slm) and determines the duty ratio of the first gas A to be 70% and stores it in the RAM 53. Also, the controller 16 checks the flow characteristics M2 stored in the RAM 53 to find the duty ratio of the second gas B that corresponds to the specified flow rate (0.25 slm) and determines the duty ratio of the second gas B to be 30% and stores it in the RAM 53.

Then, the controller 16 opens the first and second on-off valves 15A and 15B and displays the values of pressures measured by the first and second pressure sensors 14A and 14B on the display part 57. Looking at the display part 57, a user adjusts the pressure settings on the first and second regulators 13A and 13B to pressure levels that correspond to the flow characteristics L1 and M2 of the first and second gases A and B which are stored in the RAM 53, respectively.

Based on the result of measurement by the first and second pressure sensors 14A and 14B, the controller 16 checks whether the first and second gases A and B have reached the pressure levels corresponding to the flow characteristics stored in the RAM 53, namely 0.1 MPa for the first gas A and 0.2 MPa for the second gas B.

Figure 8:
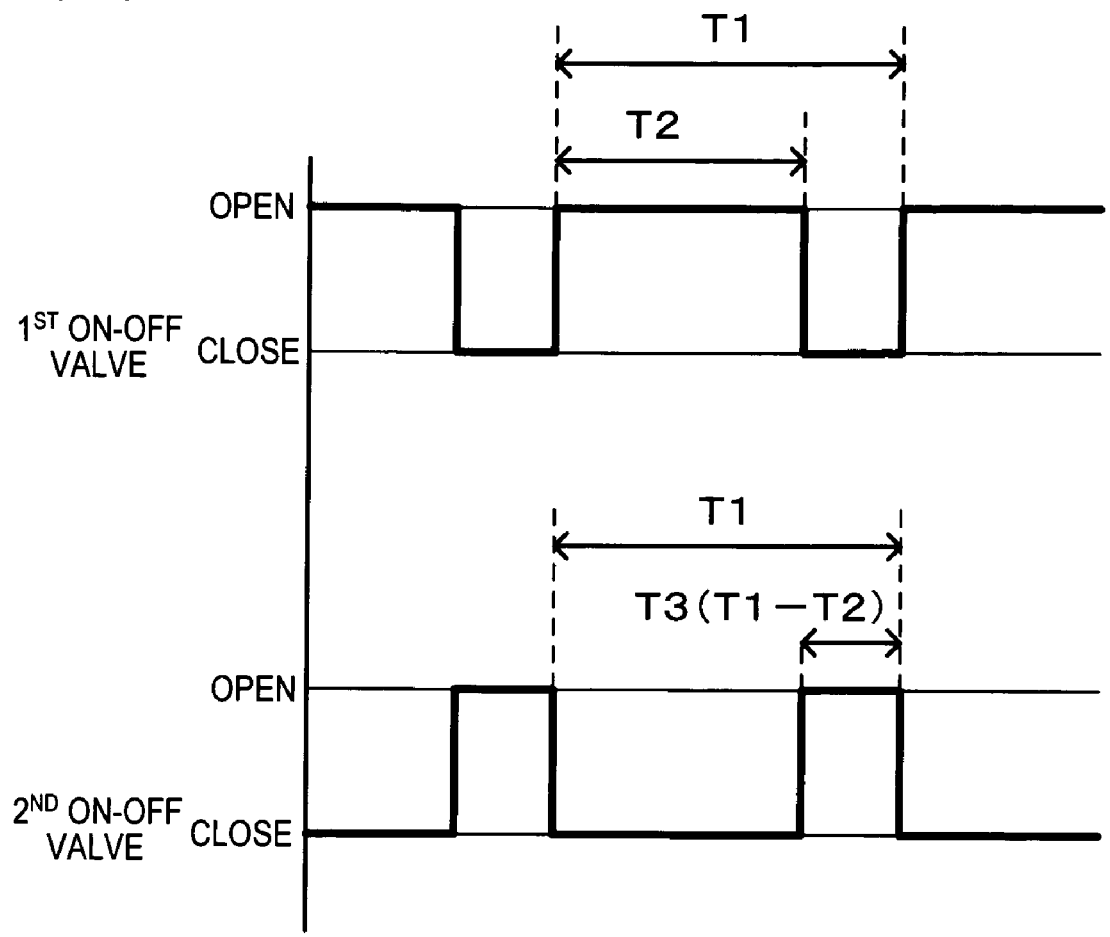
FIG. 8 is a timing chart to explain operations of the fluid mixing system.

FIG. 8 is a timing chart showing operation of the fluid mixing system 10 shown in FIG. 1.

After confirming that the first and second gases A and B have reached 0.1 MPa and 0.2 MPa respectively, the controller 16 opens and closes the first and second valves 15A and 15B alternately according to the duty ratios stored in the RAM 53 (70% for the first gas A and 30% for the second gas B).

Specifically, in the fluid mixing system 10, if one cycle in which the first and second valves 15A and 15B each open and close once alternately has a time duration T1, the controller 16 opens and holds the first valve 15A only for T2 corresponding to duty ratio 70% for the first gas A, then closes the first valve 15A and opens and holds the second valve 15B only for T3 (T1-T2) corresponding to duty ratio 30% for the second gas B, then closes the second valve 15B.

The fluid mixing system 10 repeats this cycle to supply the first and second gases A and B to the process chamber 111.

To change the types of processing gases, the host device 59 sends the controller 16 a signal which includes information on newly selected gases (fluids to be mixed, specified flow rates, etc). The controller 16 calculates duty ratios according to the fluid type and flow rate information included in the signal in the same manner as above to control the flow rates of the fluids.

Figure 9:
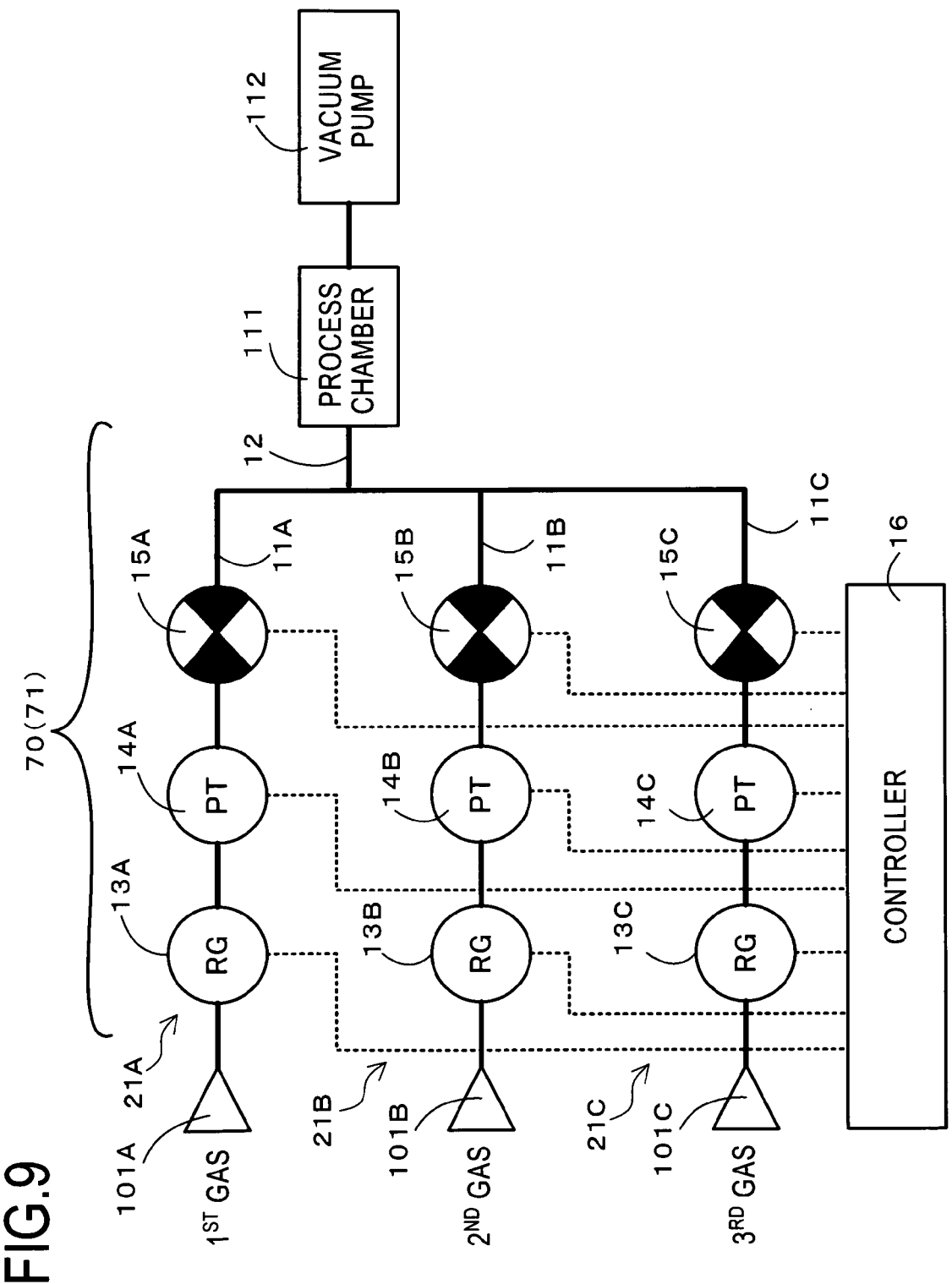
FIG. 9 is a block diagram of a modified form of the fluid mixing system according to the present invention.

In the present embodiment, the fluid mixing apparatus 20 uses two gas supply units 21A and 21B which are connected with the output pipe 22. As an alternative, a fluid mixing system 70 may be configured using a fluid mixing apparatus 71 which has three or more gas supply units 21A, 21B, 21C . . . arranged in parallel and connected with the output pipe 2 as shown in FIG. 9.

Figure 10:
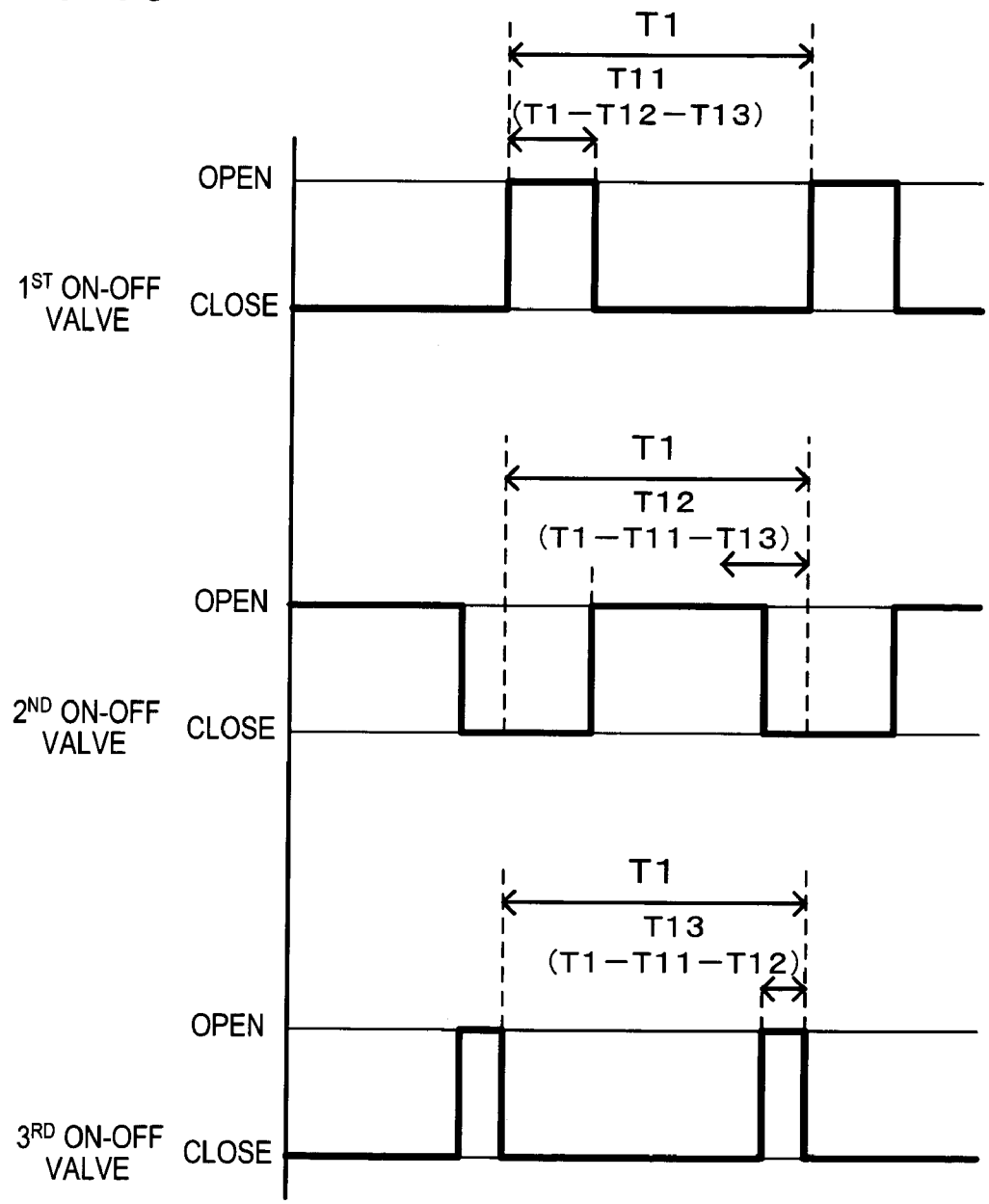
FIG. 10 is a flowchart showing behaviors of the fluid mixing system of FIG. 9.

Even when three or more gas supply units 21 are thus provided to mix three or more gases for supply to the process chamber 111, the system 70 should work as follows: the flow characteristics of the gases to be mixed in which the total flow rate of the gases is equal to the flow rate at a duty ratio of 90% are read from the flow characteristic storage section 56 and the duty ratio of each gas is determined in the same manner as above so that the valves 15A, 15B, and 15C are opened and closed sequentially as shown in FIG. 10.

For some of the gases which are used in the manufacture of semiconductors or the like, their pressure cannot be increased to a high level because of their explosiveness or similar reasons and the flow characteristic storage section 56 may not store flow characteristics in which the flow rate at a duty ratio of 90% is equal to the total flow rate of the gases to be mixed. For example, suppose that the controller 16 receives, from the host device 59, a command which specifies 1.0 slm for the flow rate of the first gas A and 0.5 slm for the flow rate of the second gas B.

In this case, the total flow rate of the first and second gases A and B is 1.5 slm. However, as shown in FIG. 6, if the pressure of the second gas B cannot be increased to 0.3 MPa or more, it is impossible to select, from the second gas B's flow characteristics stored in the flow characteristic storage section 56, flow characteristics in which the flow rate at a duty ratio of 90% is 1.5 slm.

In this case, the controller 16 reads, from the flow characteristic storage section 56, flow characteristics L3 in which the first gas A flows most smoothly, and stores it in the RAM 53. Then, the controller 16 searches for a duty ratio (50%) in the flow characteristics L3 at which the flow rate is equal to the specified flow rate (1.0 slm) and determines the duty ratio (50%) to be the duty ratio of the first gas A.

Then the controller 16 determines the duty ratio of the second gas B to be 50% because the duty ratio of the first gas A is 50%. Then it reads, from the flow characteristic storage section 56, flow characteristics M2 in which the flow rate at a duty ratio of 50% is equal to the specified flow rate, or 0.5 slm, and stores the flow characteristics M2 in the RAM 53.

Once the controller 16 has determined the duty ratio of the first gas A and that of the second gas B to be 50% and 50% respectively, it displays on the display part 57 a message that the pressures of the first and second gases A and B should be controlled to pressure levels (0.3 MPa and 0.2 MPa) corresponding to the flow characteristics L3 and M2 stored in the flow characteristic storage section 56 respectively. The user operates the first and second regulators 13A and 13B so that the first and second pressure sensors 14A and 14B read 0.3 MPa and 0.2 MPa respectively.

Then, according to the duty ratios thus determined, the first valve 15A is opened and closed at a duty ratio of 50% and then the second valve 15B is opened and closed at a duty ratio of 50%. This cycle is repeated to supply the first and second gases A and B to the process chamber 111.

For example, when the flow rates of the first to third gases A, B, and C are to be controlled using the fluid mixing system 70 shown in FIG. 9, suppose that the second gas B is a gas whose pressure cannot be increased sufficiently and there are no flow characteristics in which the flow rate at a duty ratio of 90% is equal to the total flow rate of the first to third gases A, B, and C. Herein, it is assumed that the flow rate specified for the third gas C is the highest, that for the first gas A is the second highest, and that for the second gas B is the lowest.

In this case, the duty ratios of the gases are determined in the descending order of flow rate in the same way as above. Specifically, for the third gas C (highest specified flow rate), flow characteristics in which the flow rate at a duty ratio of 90% is the highest are searched and the duty ratio corresponding to the flow rate specified for the third gas C is determined. Then, the duty ratio of the first gas A (second highest specified flow rate) is determined in the same way as in the case of the third gas C. Then, the duty ratio of the second gas B (lowest specified flow rate) is determined by subtracting the duty ratios of the first and third gases A and C from 100% and flow characteristics in which the flow rate at the determined duty ratio is equal to the flow rate specified for the second gas B are searched from the flow characteristic storage section 56.

Then, in the fluid mixing system 70, the first to third regulators 13A, 13B, and 13C are operated to adjust the gas pressures of the first to third gases A, B, and C to pressure levels corresponding to the flow characteristics which have determined the duty ratios of the first to third gases A, B, and C. Then, the fluid mixing system 70 opens and closes the first to third valves 15A, 15B, and 15C sequentially according to the duty ratios.

<Advantageous Effect of the Fluid Mixing System and Fluid Mixing Apparatus in the First Embodiment>

Therefore, the fluid mixing system 10 and fluid mixing apparatus 20 in the first embodiment deliver the first gas A and second gas B sequentially (alternately) by opening and closing the first and second valves 15A and 15B of the first and second gas supply units 21A and 21B in order according to the duty ratio indicating an opening/closing ratio in a cycle. Consequently, when the second gas B, which has a larger specific gravity (heavier gas), flows into the common line 12, it can go from the second valve 15B to the process chamber 111 quickly without being hampered by the first gas A, which has a smaller specific gravity (lighter gas). Therefore, according to the fluid mixing system 10 and fluid mixing apparatus 20 in the first embodiment, the flow rates of the first and second gases A and B to be mixed can be stabilized in a shorter time.

Consequently, in the semiconductor manufacturing system 1 which adopts the fluid mixing system 10 or the fluid mixing apparatus 20 in the first embodiment, the waiting time for the first and second gases A and B as components of the mixed gas to stabilize at their specified flow rates is shortened, leading to improvement in productivity.

The fluid mixing system 10 and the fluid mixing apparatus 20 in the first embodiment previously store flow characteristics L1 to L3 and M1 to M3 in which a duty ratio has a linear relation with the output flow rate from the on-off valve 15B (15A) when the valve 15B (15A) is opened and closed according to the duty ratio, in the flow characteristic storage section 56 on a gas-by-gas basis, and when mixing the gases, acquire the flow characteristics stored in the flow characteristic storage section 56 for each gas and determine the duty ratio of each gas. Therefore, according to the fluid mixing system 10 and the fluid mixing apparatus 20 in the first embodiment, even when the type of gas to be mixed or the mixture ratio is changed, the duty ratios can be immediately changed based on the flow characteristics stored in the flow characteristic storage section 56 and the gas flow rates can be adjusted to specified flow rates quickly.

In the fluid mixing system 10 and the fluid mixing apparatus 20 in the first embodiment, the first and second regulators 13A and 13B are located upstream of the first and second valves 15A and 15B. The flow rate varies with pressure. Therefore, according to the fluid mixing system 10 and the fluid mixing apparatus 20 in the first embodiment, the flow characteristics indicating the relation between duty ratio and flow rate can be changed and the fluid mixture ratio can be quickly changed simply by manually turning the pressure regulating mechanisms 39 of the first regulator 13A and second regulator 13B to change the pressure settings for the first gas A and second gas B flowing through the first and second valves 15A and 15B.

The fluid mixing system 10 and the fluid mixing apparatus 20 can change the mixture ratio immediately in the above manner. Accordingly, if they are adopted in the semiconductor manufacturing system 1, it is very easy to change the film quality freely in the film formation process or etch the film under different conditions in the etching process.

In the fluid mixing system 10 and the fluid mixing apparatus 20 in the first embodiment, since the output pipe 22 is directly connected with the process chamber 111 and located near it, the time for the first and second gases A and B to reach the process chamber 111 is further shortened.

(Second Embodiment)

Figure 11:
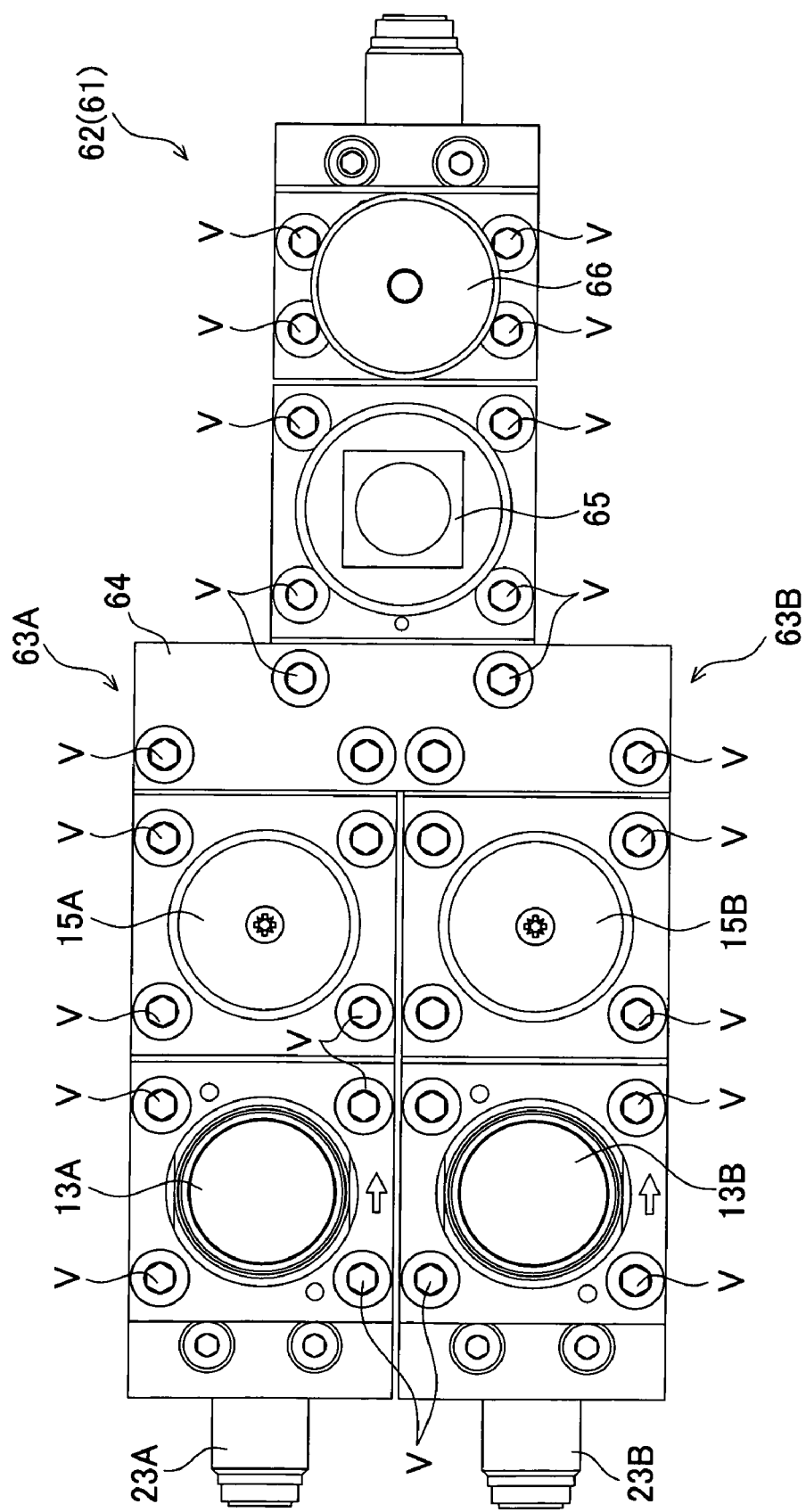
FIG. 11 is a plan view of a fluid mixing apparatus used in the fluid mixing system in a second embodiment of the present invention.
Figure 12:
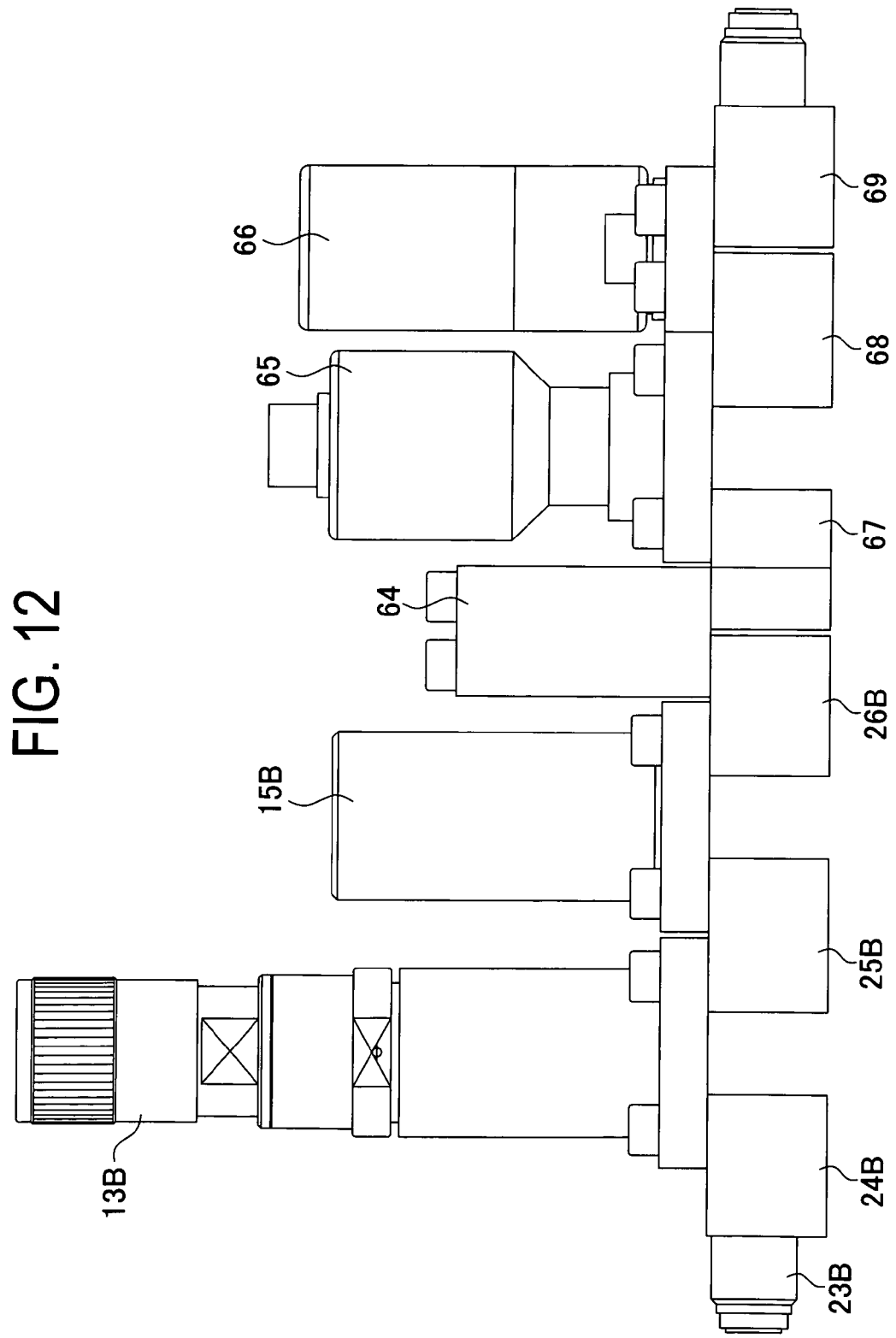
FIG. 12 is a side view of the fluid mixing system of FIG. 11.

Next, a second embodiment of the present invention will be described referring to drawings. FIG. 11 is a plan view of a fluid mixing apparatus 62 used in a fluid mixing system 61 according to the second embodiment of the invention.

The fluid mixing system 61 is structurally the same as the fluid mixing system 10 in the first embodiment except the fluid mixing apparatus 62. Therefore, the explanation given here focuses on the fluid mixing apparatus 62 which is different from the one in the first embodiment and descriptions of the same structural components and effect as in the first embodiment are omitted as appropriate.

The fluid mixing apparatus 62 has a first and second gas supply units 63A and 63B in which a first regulator 13A (a second regulator 13B) and a first valve 15A (a second valve 15B) are integrally connected in series through an input block 24A (24B) and a flow path block 25A (25B). The first gas supply unit 63A (a second gas supply 63B) is connected with a confluence block 64 through a flow path block 26A (26B). The confluence block 64 is connected with a pressure sensor 65 through a flow path block 67. The pressure sensor 65 is connected with a cutoff valve 66 through a flow path block 68. The cutoff valve 66 is fixed on an output block 69.

<Operation>

In the fluid mixing system 61 in the second embodiment, before duty control of the first and second valves 15A and 15B, the pressures of first and second gases A and B are regulated to their respective preset levels. At this time, when regulating the pressure of the first gas A, the fluid mixing system 61 closes the second valve 15B and the cutoff valve 66 and opens the first valve 15A and measures the pressure using the pressure sensor 65. Then, based on the result of pressure measurement by the pressure sensor 65, the pressure of the first gas A flowing through the first valve 15A is regulated using the first regulator 13A. The pressure of the second gas B is regulated in the same way.

After confirming based on the result of measurement by the pressure sensor 65 that the pressures of the first and second gases A and B have been regulated to their respective preset levels, the fluid mixing system 61 opens and closes the first and second valves 15A and 15B according to the duty ratios and delivers the first and second gases A and B sequentially (alternately).

<Advantageous Effect of the Fluid Mixing Apparatus According to the Second Embodiment>

In the fluid mixing apparatus according to the second embodiment, the gas supply units 63A and 63B share one pressure sensor 65, which means that the number of pressure sensors is smaller than in the first embodiment. On the other hand, the fluid mixing apparatus 62 uses one more cutoff valve 66 than in the first embodiment. However, even when more gas supply units 63 are provided, no additional pressure sensor is needed and only one cutoff valve 66 is used. Therefore, the fluid mixing apparatus 62 is more cost-effective as more gas supply units 63 are provided.

The present invention may be embodied in other specific forms without departing from the essential characteristics thereof.

(1) For example, the manual first and second regulators 13A and 13B used in the above embodiments may be replaced by electronic regulators. If electronic regulators are used, by specifying gas types and mixture ratios externally, pressure regulations can be automatically made to suit various gas types and mixture ratios.

(2) In the above embodiments, the controller 16 receives mixture ratio data from the host device 59 and controls the first and second gases A and B. However, it is also possible that the controller 16 has a mixture ratio input means and a mixture ratio is directly entered into the controller 16.

Figure 13:
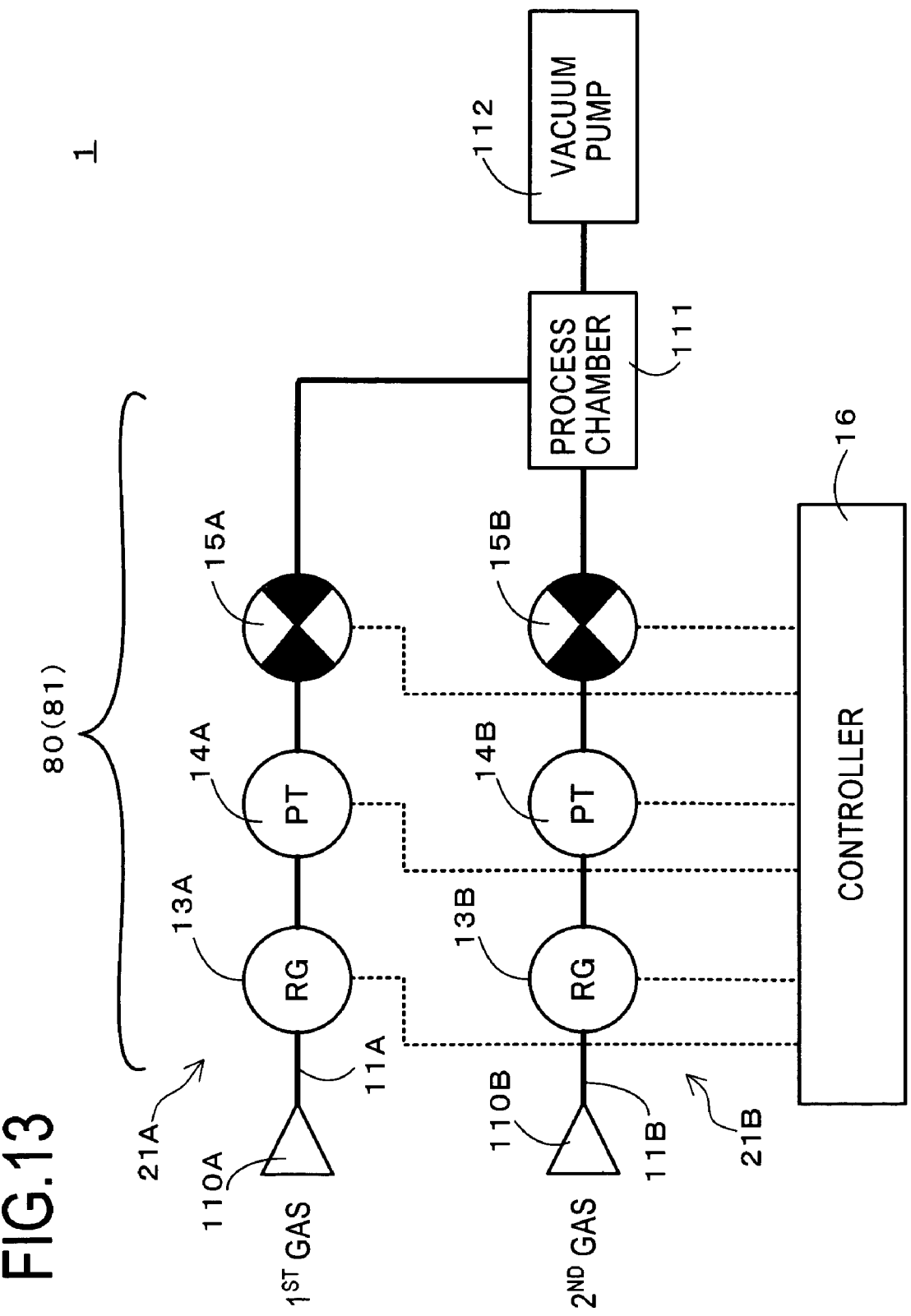
FIG. 13 is another modified form of the fluid mixing system.
Figure 14:
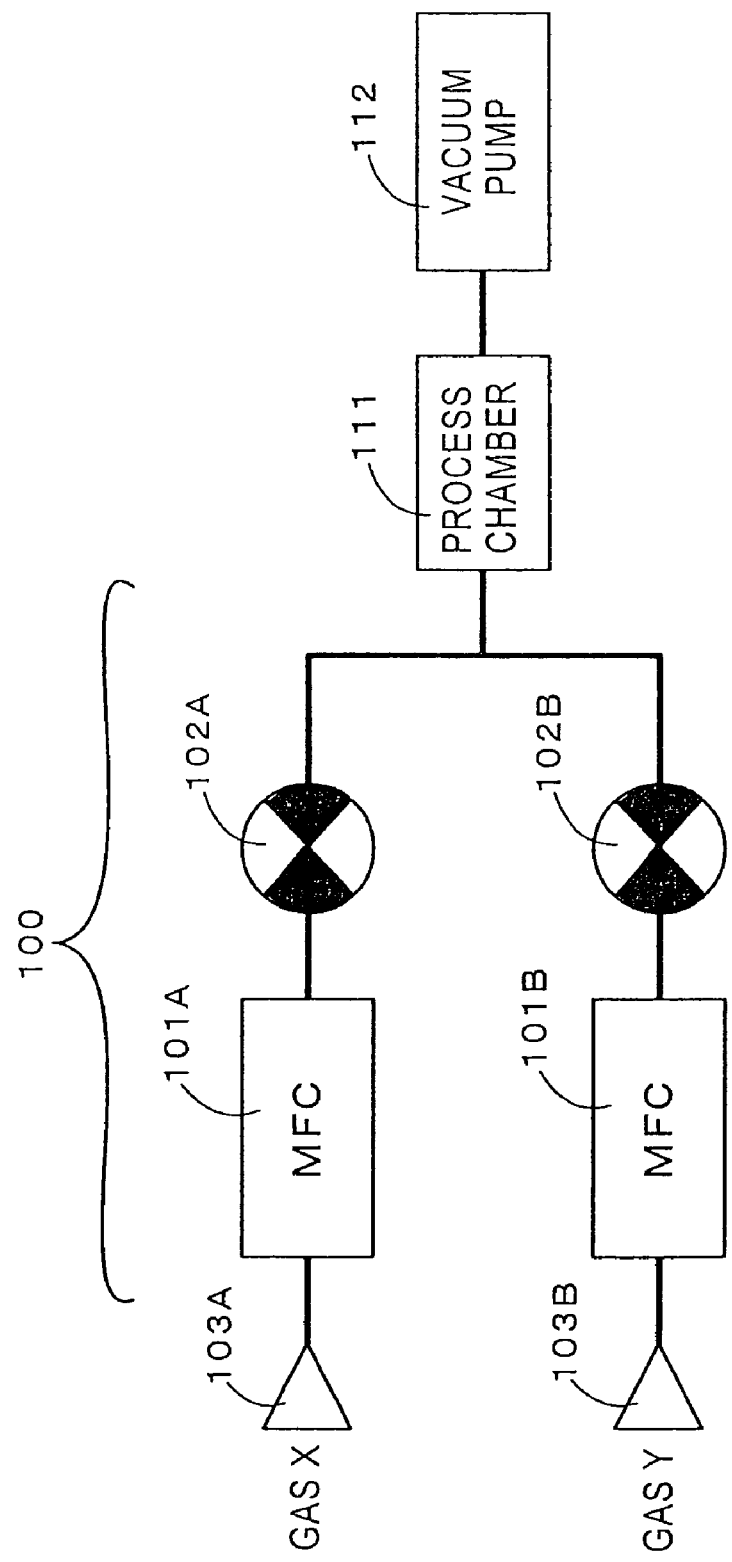
FIG. 14 is a block diagram showing an example of a conventional fluid mixing system.
Figure 15:
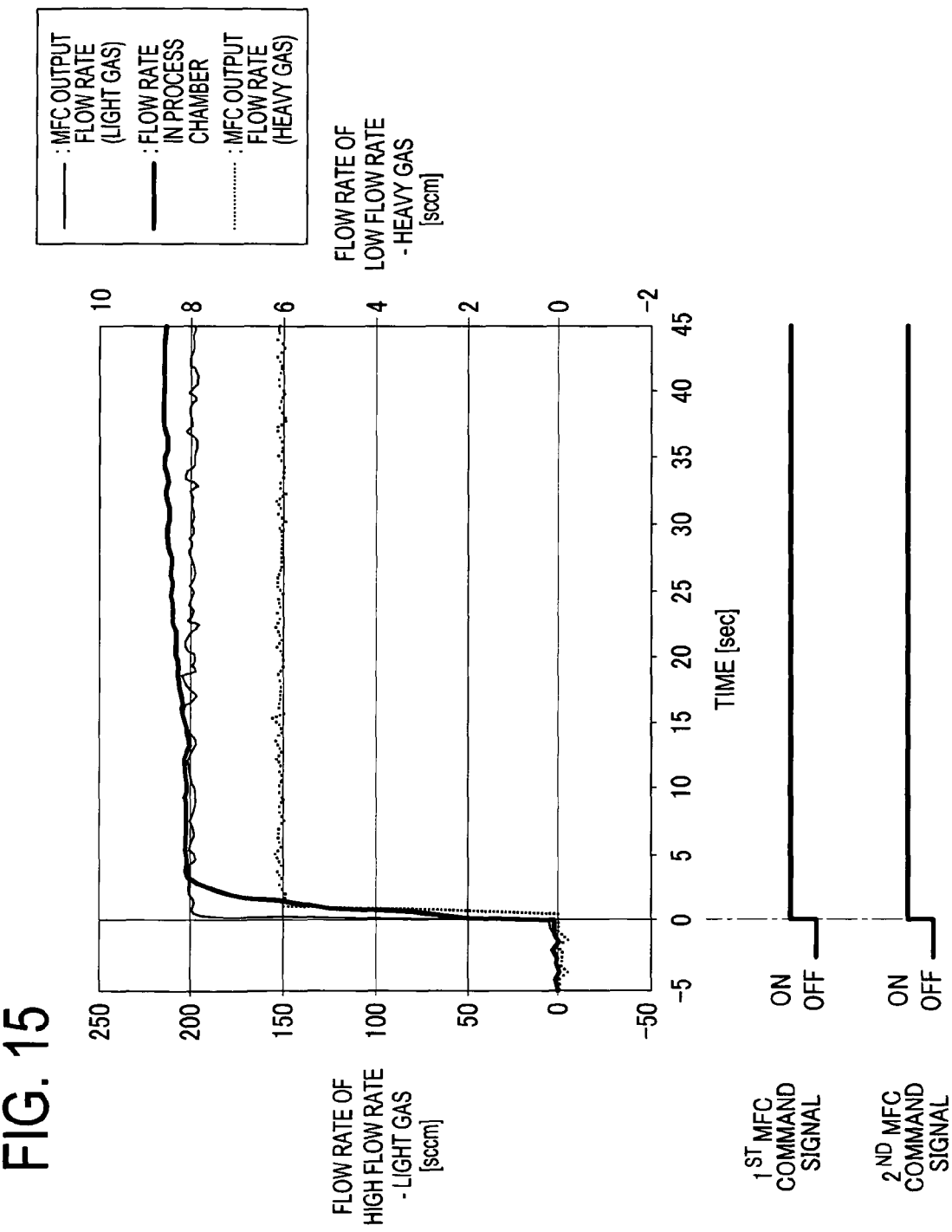
FIG. 15 is a time-series graph showing variations in flow rate of a first gas with a large specific gravity, a second gas with a small specific gravity, and a mixed gas of the first and second gases in the fluid mixing system of FIG. 14.

(3) In the above embodiments, a plurality of gas supply units 21 are connected with the output pipe 22 which is connected with the process chamber 111. As an alternative, a fluid mixing system 80 (a fluid mixing apparatus 81) may be configured as shown in FIG. 13 such that the gas supply units 21A AND 21B are directly connected with the process chamber 111. When the process chamber 111 includes a room or compartment for mixing the first and second gases A and B supplied from the first and second gas supply units 21A and 21B, the first and second gases A and B can be mixed thoroughly before being supplied to a wafer in the process chamber 111. Even if that is the case, duty ratios are calculated and the valves 15A and 15B of the gas supply units 21A and 21B are opened and closed sequentially and the gases are delivered to the process chamber 111 as in the above embodiments.

(4) In the above embodiments, the fluid mixing systems 1, 61, 70, 80 and the fluid mixing apparatuses 20, 62, 71, 81 are used to mix gases but they may also be used to mix liquids such as chemical liquids.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fluid mixing system connectable to a plurality of fluid sources for individually supplying fluids and to a container and arranged to mix the fluids and deliver the mixed fluid to the container, the system comprising:
    a first on-off valve and a second on-off valve to be provided between the fluid sources and the container to deliver the mixed fluid to the container; and
    a control part for controlling the first and second on-off valves to open and close at a duty ratio indicating an opening/closing ratio in a cycle T1 so that the first on-off valve is opened for a time T2 and then closed and the second on-off valve is opened for a time (T1-T2) and then closed to alternately deliver a first gas and a second gas, the cycle T1 being 5 msec to 500 msec.

2. The fluid mixing system according to claim 1, further comprising:
    a flow characteristic storage section which stores flow characteristics of each fluid in which the duty ratio has a linear relation with an output flow rate from the corresponding on-off valve when this valve is opened and closed according to the duty ratio,
    wherein the control part controls the on-off valves to open and close according to their respective duty ratios in the flow characteristics stored in the flow characteristic storage section.

3. The fluid mixing system according to claim 1, further comprising a plurality of pressure regulating devices for regulating pressures of the fluids respectively, each pressure regulating device being located upstream of each on-off valve.

4. The fluid mixing system according to claim 2, further comprising a plurality of pressure regulating devices for regulating pressures of the fluids respectively, each pressure regulating device being located upstream of each on-off valve.

5. A fluid mixing apparatus which will be used for the fluid mixing system set forth in claim 1, the apparatus comprising:
   the plurality of on-off valves; and
   an output pipe for coupling the on-off valves arranged in parallel to each other.

6. The fluid mixing apparatus according to claim 5, further comprising a plurality of fluid supply units, each including the on-off valve and the pressure regulating device integrally coupled in series.

7. A fluid mixing apparatus for mixing and delivering fluids, comprising:
   a first fluid supply unit and a second fluid supply unit, each including a pressure regulating device and an on-off valve integrally coupled in series;
   an output pipe coupled with the first and second fluid supply units arranged in parallel; and
   a control device which opens and closes the on-off valves of the first and second fluid supply units respectively according to respective duty ratios each indicating an opening/closing ratio in a cycle T1 so that the on-off valve of the first supply unit is opened for a time T2 and then closed and the on-off valve of the second fluid supply unit is opened for a time (T1-T2) and then closed to alternately deliver a first gas and a second gas, the cycle T1 being 5 msec to 500 msec.

* * * * *